(12) United States Patent
Orth

(10) Patent No.: US 7,383,938 B2
(45) Date of Patent: Jun. 10, 2008

(54) DEVICE FOR PRODUCING STACKS

(75) Inventor: Heribert Orth, Hofaecker (DE)

(73) Assignee: Optima Filling and Packaging, Schwaebisch Hall (DE)

( * ) Notice: Subject to any disclaimer, the term of this patent is extended or adjusted under 35 U.S.C. 154(b) by 202 days.

(21) Appl. No.: 10/518,295

(22) PCT Filed: May 6, 2003

(86) PCT No.: PCT/EP03/04960

§ 371 (c)(1),
(2), (4) Date: Jun. 30, 2005

(87) PCT Pub. No.: WO2004/005168

PCT Pub. Date: Jan. 15, 2004

(65) Prior Publication Data

US 2007/0170039 A1    Jul. 26, 2007

(30) Foreign Application Priority Data

Jun. 17, 2002  (DE) ............................ 102 28 061

(51) Int. Cl.
*B65G 47/52* (2006.01)
(52) U.S. Cl. ................ 198/418.5; 198/419.3; 198/431
(58) Field of Classification Search ......... 198/419.3, 198/418.5, 431, 457.01
See application file for complete search history.

(56) References Cited

U.S. PATENT DOCUMENTS

| 4,262,793 | A | * | 4/1981 | Hebenstreit et al. ..... 198/419.1 |
| 4,768,642 | A |   | 9/1988 | Hunter |
| 4,835,947 | A | * | 6/1989 | Langen et al. ................ 53/542 |
| 5,127,209 | A | * | 7/1992 | Hunter ........................ 53/439 |
| 5,450,941 | A | * | 9/1995 | Loewenthal ............ 198/418.5 |
| 5,579,894 | A | * | 12/1996 | Glazier et al. .............. 198/431 |
| 2001/0001997 | A1 | * | 5/2001 | Ghiotti et al. .............. 198/431 |

FOREIGN PATENT DOCUMENTS

| DE | 34 19618 A1 | 1/1985 |
| DE | 32 24 329 C2 | 9/1991 |
| DE | 32 49 850 C2 | 5/1992 |
| EP | 0 995 702 A1 | 4/2000 |
| EP | 1 148 014 A2 | 10/2001 |

OTHER PUBLICATIONS

German Search Report No. 102 28 061.4 dated May 28, 2003.
International Search Report dated Jul. 24, 2003.

* cited by examiner

*Primary Examiner*—Mark A Deuble
(74) *Attorney, Agent, or Firm*—Boyle Fredrickson, S.C.

(57) ABSTRACT

An apparatus for forming stacks of products contains, between a horizontally movable row of compartments and a vertically operating feed device, a directing device which directs in each case one product into the compartment assigned thereto. The guide device is moved along synchronously with the row of compartments, and in alignment therewith, in the region of the discharge location.

7 Claims, 3 Drawing Sheets

DEVICE FOR PRODUCING STACKS

The invention relates to an apparatus for forming stacks of individual products. Products which come directly from the production machine have to be combined to form stacks. This takes place, for example, in that the products are fed individually to a chain with compartment subdivisions. A single product, for example, ends up located in each compartment. The compartments are fastened, for example, on a roller chain. At the end of the transporting path of this row of compartments, the products are then pushed out transversely to the movement direction and then form a stack. This stack can be processed further, for example packaged.

The products are fed via transporting belts. In this case, the individual products are clamped in between two belts. The belt is driven, with the result that the products are then conveyed.

In order that the products can be pushed out, the partition walls between the individual compartments have to be lower than the height of the products. For example, the products are double the height of the partition walls between the compartments. The transfer between the feed device and the moving row of compartments takes place without the compartments coming to a standstill. The products are thus introduced into the compartments at a certain speed. This takes place, for example, from above. Over the last movement section, the products, for the abovementioned reasons, cannot be guided. They thus strike against the base of the compartments at a certain speed, which may result in them rebounding. Since it is often the case that the products, rather than having any precise shape or size, are also inherently unstable, there is a risk, in the case of high-speed apparatuses, of a product not meeting up with its compartment. The product is then located above the partition walls and prevents the following products from finding their own compartment.

This problem arises, in particular, when the feed path of the products runs vertically.

The object of the invention is for an apparatus for forming stacks of products to be configured such that, even in the case of high operating speeds, it can operate reliably and without disruption.

In order to achieve this object, the invention proposes an apparatus having the features mentioned in claim 1. Developments of the invention form the subject matter of subclaims.

The feed device feeds the products one behind the other. The feed device here is arranged essentially vertically, but may also run slightly obliquely in relation to a vertical. From the discharge location of the feed device, the products are moved on without guidance by the feed device, and they have a not inconsiderable speed as they leave the feed device. They then drop into the compartments at this speed. In the region between the discharge location and the beginning of the compartment, they are guided laterally by the guide device proposed by the invention, this ensuring that the products find their own compartment in each case. Even rebounding does not result in them leaving their compartment.

The distance between the discharge end of the feed device and the top edge of partitions between the compartments may, in a development of the invention, be greater than half the length of the products, as measured in the dropping direction. The guide device acts at these locations.

The guide device may be designed, for example, such that it has at least two directing elements which are moved along synchronously with the row of compartments and are preferably designed as guide blades. The directing elements here need only be moved along with the compartments in the region of the discharge location. As soon as the product is arranged in its compartment, the guide blades can be drawn out of the row of products again.

In particular, it may be provided that the directing elements are arranged such that they form an extension of that compartment of the row of compartments which is assigned to the discharge location. The compartment is thus extended, for all practical purposes, up to the discharge location.

According to the invention, it may be provided that the guide device is arranged such that it is only active in the region of the transfer location. It is, of course, also possible for it to be configured such that it is also active over a certain distance downstream of the transfer location, in order to cause the products to be calmed.

The guide device may be designed, for example, as a circulating device. For example, it may have a plurality of circulating directing elements of which the route in the region of the transfer location coincides with the path of the row of compartments.

A possible way in which the directing elements may be equipped as circulating elements consists in them being fitted on a circulating chain. It is possible here for the directing elements to be guided such that the directing element arranged between two products is moved out transversely to the movement direction of the row of compartments. The respectively other directing element acts on the final product of a row, with the result that it can be moved with pivoting action.

It is possible for the two directing elements of the guide device which are each assigned to a compartment to be adjusted such that the product is clamped in slightly. This prevents altogether any spring-back action.

If the product comes out of the production line in the incorrect position and thus misses its window in the bottom row of compartments, it is slung out of the region between the feed device and compartments by one of the directing elements of the guide device. This prevents it from resulting in dust formation. This means that there are then no follow-up errors. The only disadvantage in such a case would be that a stack contains one product fewer than planned.

Further features, details and advantages of the invention can be gathered from the following description of a preferred embodiment of the invention, from the patent claims and from the abstract, which is worded in relation to the contents of the description, and with reference to the drawing, in which:

Figure 1:
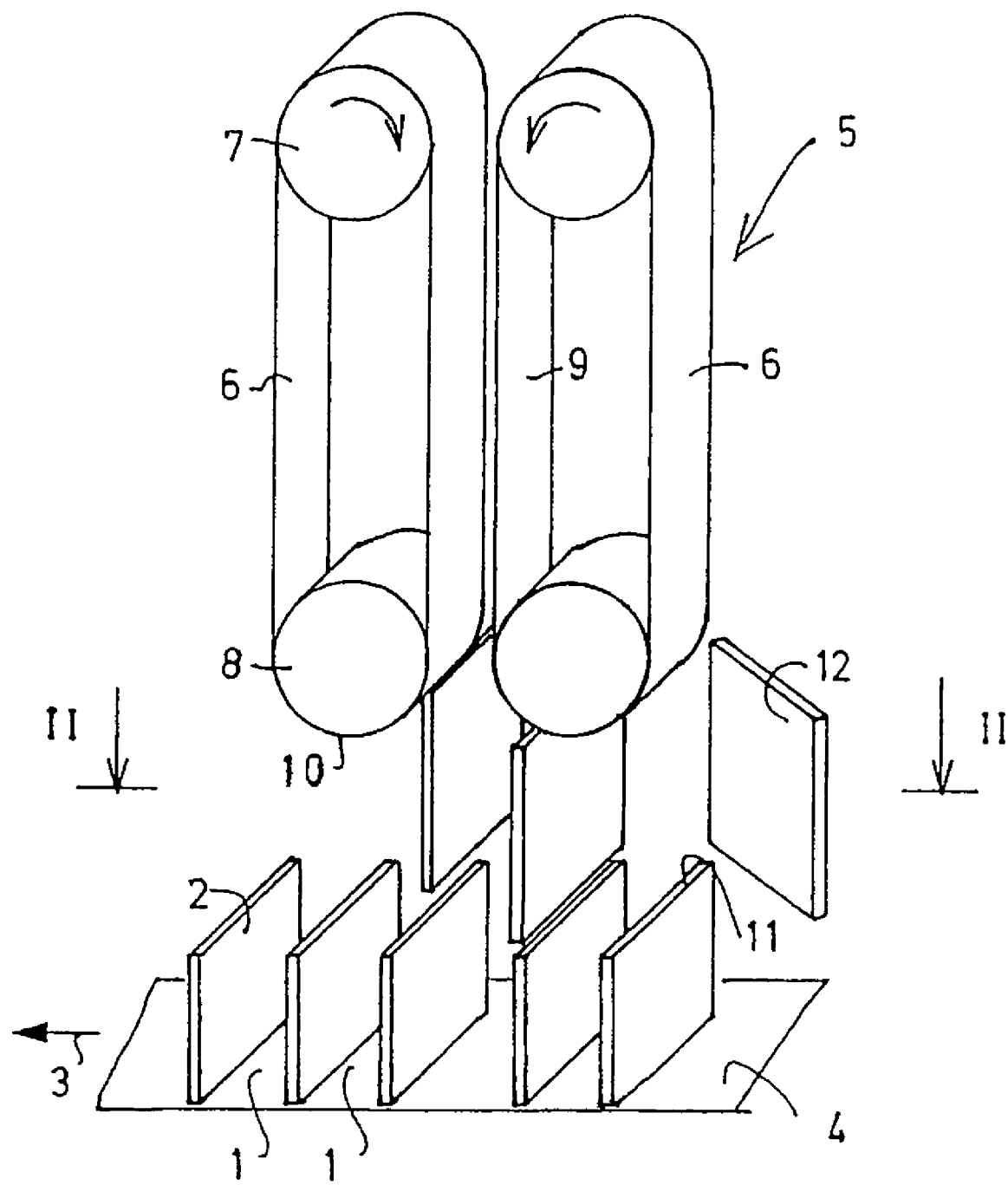
FIG. 1 shows, schematically, the apparatus proposed by the invention without any products.

FIG. 1 shows a simplified overview of the various parts of the apparatus proposed by the invention. The apparatus for forming stacks of products contains a row of compartments 1 which are defined by partitions, for example, in the form of partition walls 2. These partition walls 2 each form, in between, a single compartment for accommodating a product. The partition walls 2 are moved in the direction of the arrow 3, to be precise continuously without coming to a standstill. The compartments are closed off by a base 4. It is possible for the partition walls 2 to be connected directly to the base 4, with the result that the base 4 moves along with the partition walls 2. It is likewise possible for the partition walls 2 to be connected to a drive chain upstream or downstream of the plane of the drawing, and to move independently of the base 4. The base 4 may also be fixed. In this case, the products are pushed over the base 4. The important factor is for the compartments 1 between in each case two partition walls 2 to be moved in the direction of the arrow 3.

Arranged above the row of compartments 1 is a feed device 5 which feeds individual products one behind the other to the row of compartments. In the example illustrated, the feed device 5 contains two circulating belts 6 which, illustrated in simplified form, are guided around two drive rollers 7, 8 and are driven by the latter. The mutually facing inner strands 9 of the two belts 6 both move in the downward direction. The bottom end 10 of the feed device is located above the top edge 11 of the partition walls 2. A further device with individual directing elements 12 is arranged in this region between the top edge 11 of the partition walls 2 and the underside 10 of the feed device 5. These directing elements 12 move in the space between the discharge location of the feed device 5 and the top edge 11 of the partition walls 2. They have a height which is somewhat smaller than the distance between the two locations mentioned. In the region located beneath the feed device 5, the directing elements 12 move at the same speed as the partition walls 2 of the compartments 1.

Figure 2:
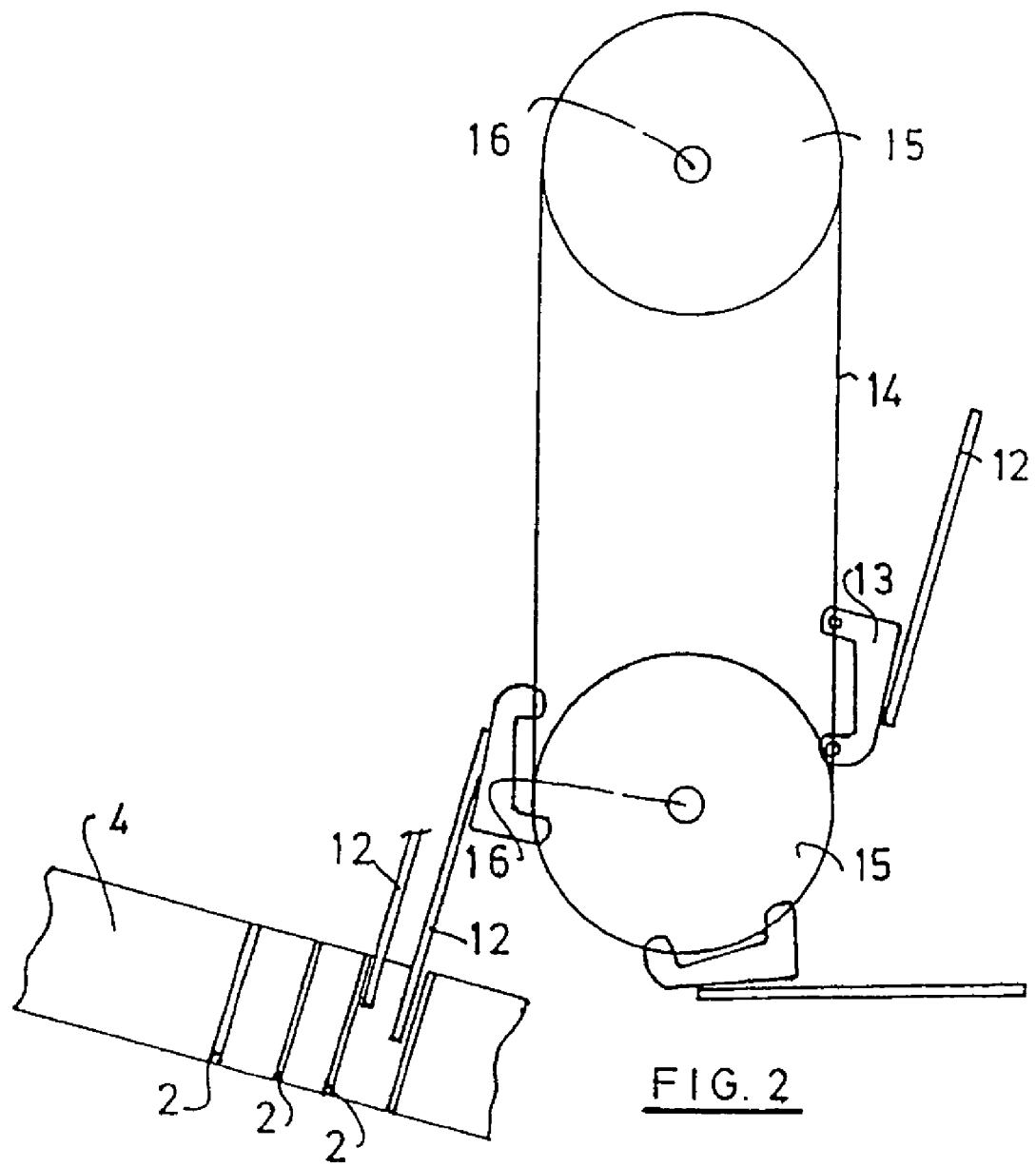
FIG. 2 shows a schematic section along line II-II in FIG. 1.

FIG. 2 shows how the directing elements 12, as guide blades, are fitted on a circulating chain 14 with the aid of shoes 13. The chain 14 is guided around two gearwheels 15 which can be rotated about vertical axes 16. Arranging the directing elements 12 on the shoes 13 can ensure that the directing elements 12 move with certain kinematics in the region of the transfer location between the feed device 5 and the row of compartments. Since the feed device 5 always supplies the final product of a row, the right-hand directing element 12 in FIGS. 1 and 2 can execute a pivoting movement since it is pivoted over an empty compartment. In contrast, the respectively left-hand directing element 12 in FIG. 1 is guided such that it draws back rearward transversely to the movement direction of the row of compartments. The relatively quick swing-round action of the directing elements 12 can be achieved by the device illustrated schematically in FIG. 2. Of course, it is also possible for specific kinematics to be promoted by the directing elements 12 engaging in curved guides or the like.

Figure 3:
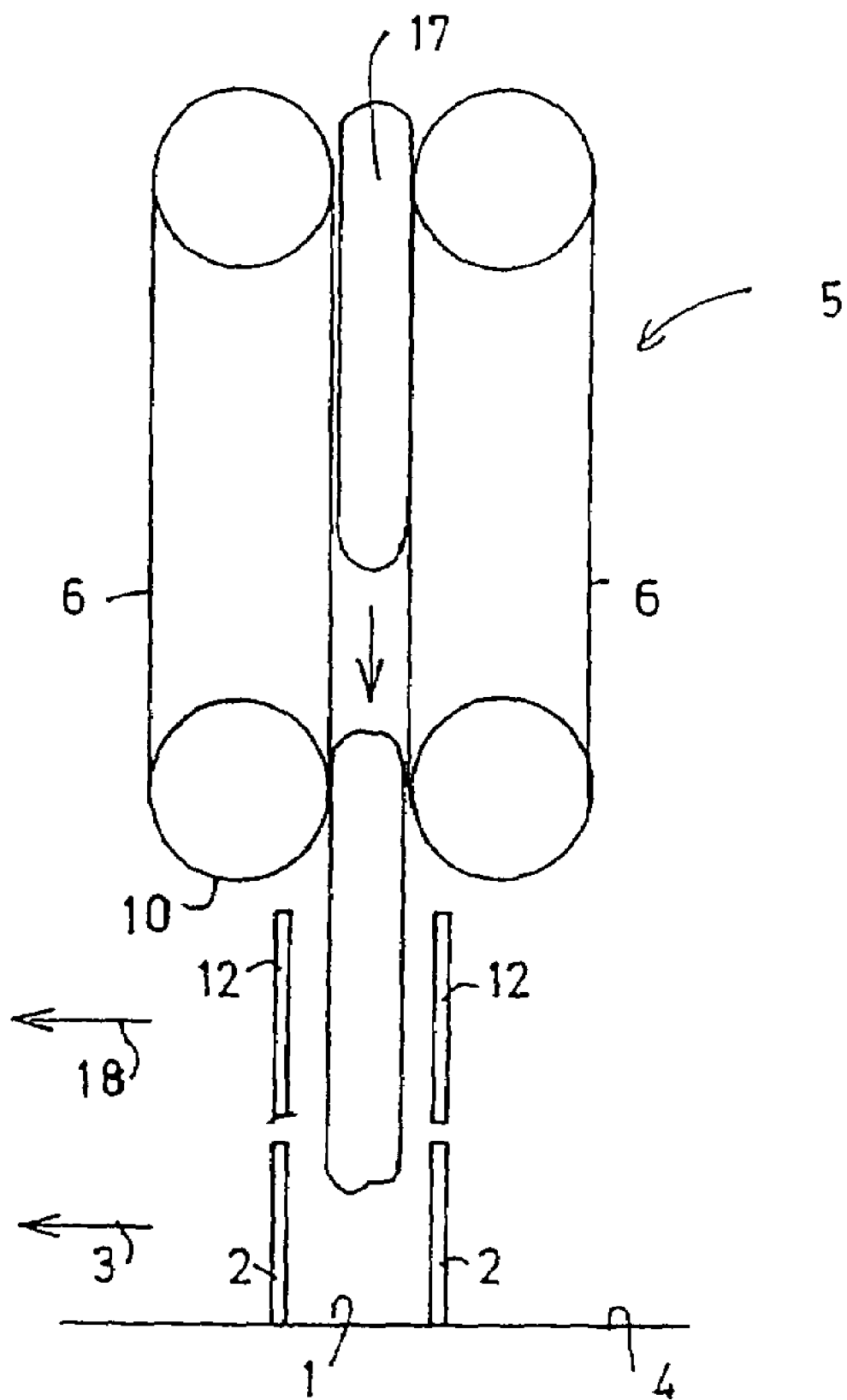
FIG. 3 shows, in simplified form, the arrangement of a product during transfer from the feed device to a compartment.

FIG. 3, then, shows in vastly simplified form, and directly from the front, the operation of how a product which is to be combined in a stack is moved downward in the discharge region of the feed device 5. The products 17 are moved downward at a relatively high speed by the moving belts 6 and then strike against the base 4 of a compartment 1. FIG. 3 shows the state just prior to release between the belts 6 and coming into contact with the base 4. The directing elements 12 of the guide device are arranged immediately above the partition walls 2 between the individual compartments 1. They move at the same speed, and in alignment in relation to the partition walls 2, in the direction of the arrow 18. The products 17 can thus find their correct compartment in a precise manner, and the situation where they may cause disruption to subsequent compartments is prevented.

As has already been mentioned, it is possible for the directing elements 12 to be guided such that they are moved closer together, in order thus for the product 17 to be guided to even better effect and also, if appropriate, to prevent a spring-back action.

The invention claimed is:

1. An apparatus for forming stacks of products, having an essentially horizontal continuously movable row of compartments, a feed device which conveys individual products one behind the other to a discharge location above the row of compartments and allows the products to drop into the compartments, or casts them into the same, and having a guide device which guides in each case one product between the discharge location of the feed device and the compartment assigned to the product and wherein the guide device operates in circulation.

2. The apparatus as claimed in claim 1, wherein the guide device has at least two directing elements which are moved along synchronously with the row of compartments and are preferably designed as guide blades.

3. The apparatus as claimed in claim 2, wherein the directing elements are arranged such that they form an extension of that compartment of the row of compartments which is assigned to the discharge location.

4. The apparatus as claimed in claim 2, wherein the directing elements are guided such that the directing element arranged between two products is moved out transversely to the movement direction of the row of compartments.

5. The apparatus as claimed in claim 2, wherein the directing elements are fitted on a chain.

6. The apparatus as claimed in claim 1, wherein the guide device is arranged such that the guide device is only active in the region of the transfer location between the feed device and the row of compartments.

7. The apparatus as claimed in claim 1, wherein the guide device has a plurality of circulating directing elements of which the route in the region of the transfer location coincides with the path of the row of compartments.

* * * * *

UNITED STATES PATENT AND TRADEMARK OFFICE
CERTIFICATE OF CORRECTION

| | |
|---|---|
| PATENT NO. | : 7,383,938 B2 |
| APPLICATION NO. | : 10/518295 |
| DATED | : June 10, 2008 |
| INVENTOR(S) | : Heribert Orth |

Page 1 of 1

It is certified that error appears in the above-identified patent and that said Letters Patent is hereby corrected as shown below:

Title Page; item (73);
On the first page of the patent, the assignee's name is incorrect:

"Optima Filling and Packaging" should be --Optima Filling and Packaging Machines GmbH--.

Signed and Sealed this

Twenty-fourth Day of March, 2009

JOHN DOLL
*Acting Director of the United States Patent and Trademark Office*